United States Patent
Cocchi et al.

(10) Patent No.: US 9,560,865 B2
(45) Date of Patent: Feb. 7, 2017

(54) PISTON OPERATED DISPENSER UNIT FOR LIQUID OR SEMI-LIQUID FOOD PRODUCTS

(71) Applicant: ALI S.p.A.—CARPIGIANI GROUP, Milano (IT)

(72) Inventors: Andrea Cocchi, Calderara Di Reno (IT); Victor Daniel Carbo'Dominguez, Potries (ES)

(73) Assignee: ALI S.p.A.—CARPIGIANI GROUP, Milan (IT)

( * ) Notice: Subject to any disclaimer, the term of this patent is extended or adjusted under 35 U.S.C. 154(b) by 87 days.

(21) Appl. No.: 14/553,036

(22) Filed: Nov. 25, 2014

(65) Prior Publication Data
US 2015/0150280 A1    Jun. 4, 2015

(30) Foreign Application Priority Data

Nov. 29, 2013    (IT) ............................... BO2013A0666

(51) Int. Cl.
*B67D 7/50*  (2010.01)
*A23G 9/28*  (2006.01)
*A23G 3/02*  (2006.01)

(52) U.S. Cl.
CPC . *A23G 9/28* (2013.01); *A23G 3/02* (2013.01); *A23G 9/281* (2013.01)

(58) Field of Classification Search
CPC .................................. A23G 9/28; A23G 9/281
USPC ........ 222/554, 509; 251/236, 242, 243, 246, 251/337; 267/228, 69–74, 158, 165
See application file for complete search history.

(56) References Cited

U.S. PATENT DOCUMENTS

| | | | | |
|---|---|---|---|---|
| 146,371 A | * | 1/1874 | Webber | F16K 1/00 251/242 |
| 413,941 A | * | 10/1889 | Hawkins | F16K 3/26 15/419 |
| 885,878 A | * | 4/1908 | Skirrow | F16C 11/0619 267/71 |
| 1,344,068 A | * | 6/1920 | Emil | A41F 3/045 267/70 |
| 1,433,201 A | * | 10/1922 | Grant | B60R 19/285 267/165 |
| 1,800,368 A | * | 4/1931 | Tomlinson | A47J 31/46 137/594 |

(Continued)

FOREIGN PATENT DOCUMENTS

| | | |
|---|---|---|
| EP | 1 495 682 A1 | 1/2005 |
| EP | 2 316 275 A1 | 5/2011 |

*Primary Examiner* — Kevin P Shaver
*Assistant Examiner* — Michael J Melaragno
(74) *Attorney, Agent, or Firm* — Kenner, Otto, Boisselle & Sklar, LLP

(57) ABSTRACT

A piston-operated dispenser unit for confectionery food products, comprising (I) a door (4) mountable on a dispensing mouth (5) of a machine (2) for making and instantaneously dispensing confectionery products; (II) at least one dispensing tap (9), in turn comprising a main body (10), extending frontally from the door (4) and forming, inside the door (4), an outflow duct (11) for the product to be dispensed, and a piston (13), slidably mounted inside the duct (11) and mobile between an open position and a closed position of the duct (11); (III) a manually operated lever (17), connected to the piston (13) for moving the piston (13) between the open position and the closed position of the duct (11), and vice versa; and (IV) a spring (24) operating on the piston (13) to apply an action for keeping the piston (13) in the closed position.

7 Claims, 4 Drawing Sheets

(56) References Cited

U.S. PATENT DOCUMENTS

| | | | | |
|---|---|---|---|---|
| 1,806,447 A * | 5/1931 | Carson, Jr. | | F16K 27/02 251/243 |
| 2,164,709 A * | 7/1939 | Hall | | E21B 1/02 267/70 |
| 2,924,448 A * | 2/1960 | Nantz | | F16F 1/125 267/74 |
| 3,052,381 A * | 9/1962 | Poerio | | A23G 9/281 222/132 |
| 3,170,676 A * | 2/1965 | Koch | | A23G 9/224 366/196 |
| 3,172,422 A * | 3/1965 | Koch | | A23G 9/281 137/375 |
| 3,272,496 A * | 9/1966 | Halopoff | | E05D 13/1223 267/173 |
| 3,276,633 A * | 10/1966 | Rahauser | | A23G 9/281 222/129.1 |
| 3,330,129 A * | 7/1967 | Halverson | | A23G 9/281 222/145.3 |
| 3,661,303 A | 5/1972 | Prosenbauer | | |
| 3,868,050 A * | 2/1975 | Gorychka | | F16K 31/5286 222/509 |
| 3,898,859 A * | 8/1975 | Duke | | A23G 9/12 62/135 |
| 3,934,759 A * | 1/1976 | Giannella | | A47J 31/401 222/129.1 |
| 3,989,492 A * | 11/1976 | Keyes | | A23G 9/045 366/262 |
| 4,054,192 A * | 10/1977 | Johnson | | F16D 41/067 192/45.014 |
| 4,088,211 A * | 5/1978 | Doller | | F16D 41/067 192/45.011 |
| 4,503,443 A * | 3/1985 | Dagna | | B41J 2/17513 347/55 |
| 4,588,093 A * | 5/1986 | Field | | B65D 25/101 211/11 |
| 4,711,376 A * | 12/1987 | Manfroni | | A23G 9/283 222/146.1 |
| 4,722,461 A * | 2/1988 | Symmank | | B65D 83/16 222/181.1 |
| 4,793,279 A * | 12/1988 | Grenier | | A23G 9/28 118/16 |
| 4,805,885 A * | 2/1989 | Gingerich | | H01H 15/06 267/165 |
| 4,832,320 A * | 5/1989 | Scowen | | B60G 15/06 267/148 |
| 4,878,760 A * | 11/1989 | Newton | | A23G 9/163 222/235 |
| 4,881,663 A * | 11/1989 | Seymour | | A23G 9/283 222/132 |
| 4,905,972 A * | 3/1990 | Scowen | | F16F 1/027 267/152 |
| 4,927,124 A * | 5/1990 | Spedding | | B60G 11/00 267/149 |
| 5,013,013 A * | 5/1991 | Spedding | | F16F 1/366 267/148 |
| 5,382,090 A * | 1/1995 | Cocchi | | A23G 9/281 222/145.5 |
| 5,400,614 A * | 3/1995 | Feola | | A23G 9/163 366/102 |
| 5,405,054 A * | 4/1995 | Thomas | | A23G 3/28 222/105 |
| 5,463,877 A * | 11/1995 | Young | | A23G 9/22 222/146.6 |
| 5,487,493 A * | 1/1996 | McNabb | | B67D 1/1466 222/146.6 |
| 5,668,565 A * | 9/1997 | Robinson | | H01Q 1/085 333/34 |
| 5,813,574 A * | 9/1998 | McNabb | | A23G 9/228 222/146.6 |
| 5,957,040 A * | 9/1999 | Feola | | A23G 9/163 220/630 |
| 6,003,538 A * | 12/1999 | Smith | | E03B 7/10 137/62 |
| 6,109,599 A * | 8/2000 | Kringel | | F16F 1/12 267/170 |
| 6,119,905 A * | 9/2000 | Cocchi | | A23G 9/281 222/509 |
| 6,189,745 B1 * | 2/2001 | Frank | | B67D 1/1466 137/614.2 |
| 6,213,174 B1 * | 4/2001 | Cook | | G01G 13/06 141/1 |
| 6,460,580 B1 * | 10/2002 | Cunha | | A23G 9/045 141/18 |
| 7,451,613 B2 * | 11/2008 | Barraclough | | A23G 9/08 222/146.6 |
| 7,658,205 B1 * | 2/2010 | Edelman | | F16L 37/32 137/594 |
| 8,016,168 B2 * | 9/2011 | Goulet | | A23G 9/045 222/146.6 |
| 8,562,075 B2 * | 10/2013 | Honnorat | | F16F 1/025 188/371 |
| 2003/0006254 A1 * | 1/2003 | Itou | | B67D 1/145 222/518 |
| 2003/0047571 A1 * | 3/2003 | Ramsey | | B05B 11/3077 222/321.9 |
| 2006/0033252 A1 * | 2/2006 | Elmoselhy | | F16F 1/021 267/165 |
| 2007/0116804 A1 * | 5/2007 | Cocchi | | A23G 9/045 426/100 |
| 2007/0257060 A1 * | 11/2007 | Young | | B05B 11/3001 222/153.13 |
| 2007/0262081 A1 * | 11/2007 | Feola | | A23G 9/08 221/8 |
| 2007/0267792 A1 * | 11/2007 | Elmoselhy | | F16F 1/027 267/195 |
| 2008/0148965 A1 * | 6/2008 | Bravo | | A23G 9/28 99/455 |
| 2009/0217825 A1 * | 9/2009 | Cocchi | | A23G 9/28 99/455 |
| 2010/0050655 A1 * | 3/2010 | Bravo | | A23G 9/281 62/1 |
| 2010/0116846 A1 * | 5/2010 | Cortese | | A23G 9/28 222/66 |
| 2010/0122539 A1 * | 5/2010 | Cocchi | | A23G 9/28 62/1 |
| 2011/0006079 A1 | 1/2011 | McKay et al. | | |
| 2011/0114664 A1 * | 5/2011 | Wadle | | B67D 1/0034 222/145.6 |
| 2011/0239669 A1 * | 10/2011 | Cocchi | | A23G 9/045 62/125 |
| 2012/0104046 A1 * | 5/2012 | Wadle | | A23G 9/12 62/342 |
| 2012/0199608 A1 * | 8/2012 | Cocchi | | A23G 9/225 222/146.6 |
| 2013/0068331 A1 * | 3/2013 | Matz | | F16K 11/07 137/625.48 |
| 2014/0367424 A1 * | 12/2014 | Newton | | A23G 9/281 222/482 |
| 2015/0306639 A1 * | 10/2015 | Cocchi | | A23G 9/30 134/18 |
| 2015/0306640 A1 * | 10/2015 | Lazzarini | | B08B 9/08 134/18 |

* cited by examiner

PISTON OPERATED DISPENSER UNIT FOR LIQUID OR SEMI-LIQUID FOOD PRODUCTS

This application claims priority of Italian Application No. BO2013A 000666 filed Nov. 29, 2013, which is hereby incorporated herein by reference.

BACKGROUND OF THE INVENTION

This invention relates to a piston-operated dispenser unit for liquid or semi-liquid food products.

More specifically, this invention relates to a dispenser unit which is mounted on machines for making and instantaneously dispensing confectionery products in creamy or semi-liquid form.

The dispenser unit of the invention is advantageously suitable for mounting on machines for making and instantaneously dispensing frozen confectionery products such as soft ice cream served directly from the machine, yogurt ice cream or creamy ice cream cake and pastry fillings.

The dispenser unit of the invention can also be mounted on machines for making and instantaneously dispensing hot confectionery products such as chocolate, creams and the like.

For convenience of description and without limiting the scope of the invention, this specification refers expressly to machines for making and instantaneously dispensing frozen confectionery products (in particular, soft ice cream).

These machines usually have a product collection bin, a product processing cylinder located downstream of the collection bin, a dispenser unit comprising a tap mounted at the outlet of the cylinder and a cooling circuit for the product being processed in the cylinder.

More specifically, as is known, the main body of the tap comprises a duct having, at one end of it, an inlet mouth in communication with the processing cylinder, and, at the other end, an outlet mouth for dispensing the product made.

Slidably mounted inside the duct is a piston which is mobile between an open position and a closed position of the duct.

The piston is operated manually by the operator by means of a lever which is lowered to move the piston to the open position and raised to move the piston to the closed position.

The product is fed into the cylinder by a gear pump or a peristaltic pump or, alternatively, is gravity fed and, inside the cylinder, is processed and pushed towards the outlet mouth by a single- or double-spiral rotary stirrer.

Between one dispensing and the next, the tap lever must be reset. Furthermore, after each dispensing, the tap lever must always be brought to the raised position to prevent product from coming out when not required.

One drawback encountered during use is that the piston is not returned exactly to its closed position, causing an unwanted extra amount of product to be dispensed or to leak out. This is often due to the fact that the operator does not raise the lever all the way or, more rarely, does not raise it at all. The problem may, however, also be caused by slack in the piston-lever assembly preventing the piston and/or the lever from reaching the end of stroke position or causing it to return to a half open position.

SUMMARY OF THE INVENTION

This invention has for an aim to provide a piston-operated dispenser unit for confectionery food products which overcomes the above mentioned drawback.

This aim is fully achieved by the piston-operated dispenser unit for confectionery food products according to this invention as characterized in the appended claims.

BRIEF DESCRIPTION OF THE DRAWINGS

The technical features and advantages of the invention are more apparent in the following description of a preferred but non-limiting embodiment of it. The description refers to the accompanying drawings, which are also provided purely by way of non-limiting example and in which.

DESCRIPTION OF THE PREFERRED EMBODIMENTS

With reference to the accompanying drawings, the numeral 1 denotes in its entirety a piston-operated dispenser unit for liquid or semi-liquid food products.

The dispenser unit 1 is mounted on the front of a machine 2 for making and instantaneously dispensing liquid or semi-liquid food products and forms part of the machine 2 itself.

Figure 1:
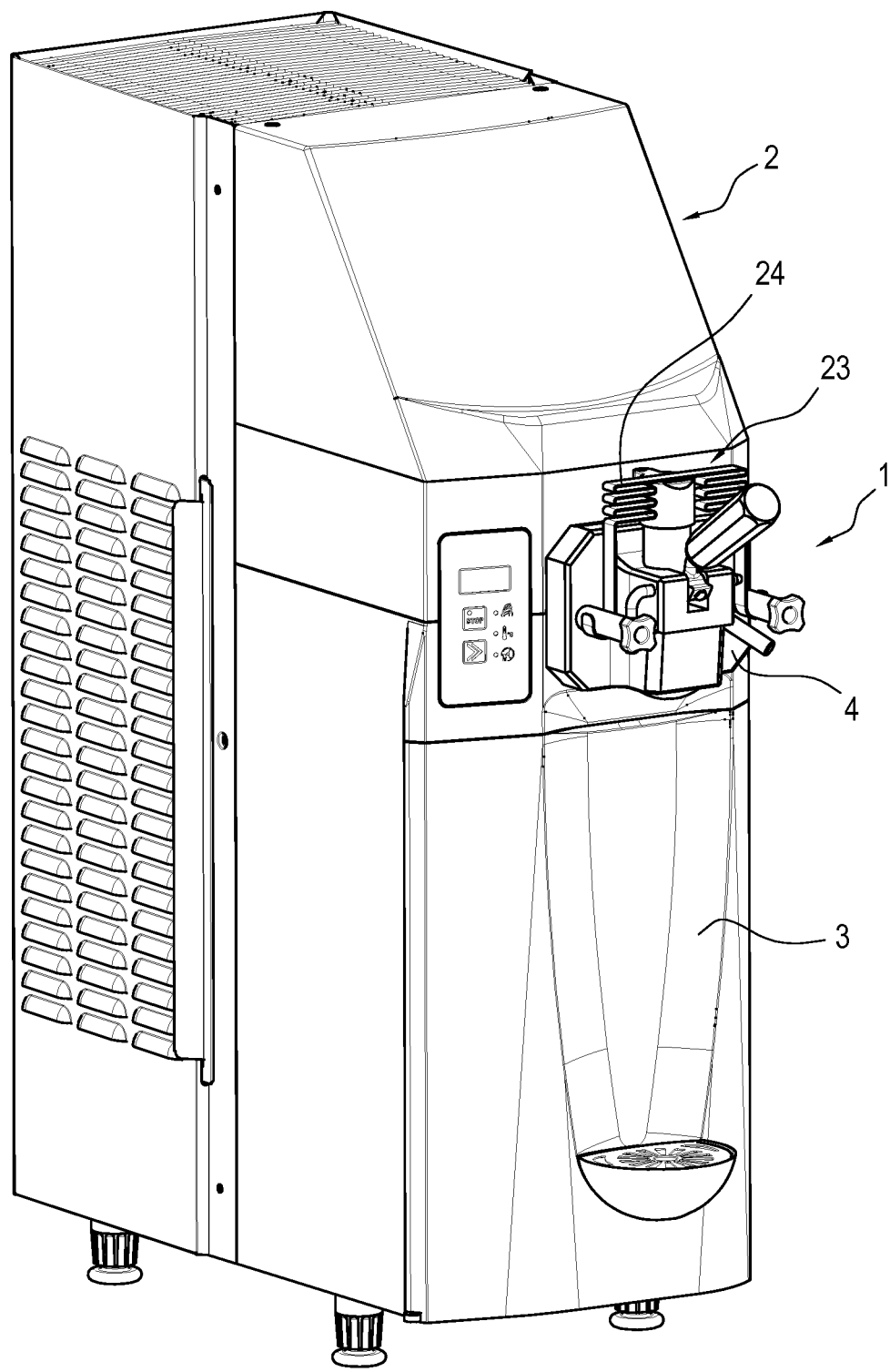
FIG. 1 shows a machine for making and instantaneously dispensing confectionery products and which mounts an embodiment of the piston-operated dispenser unit of this invention.
Figure 2:
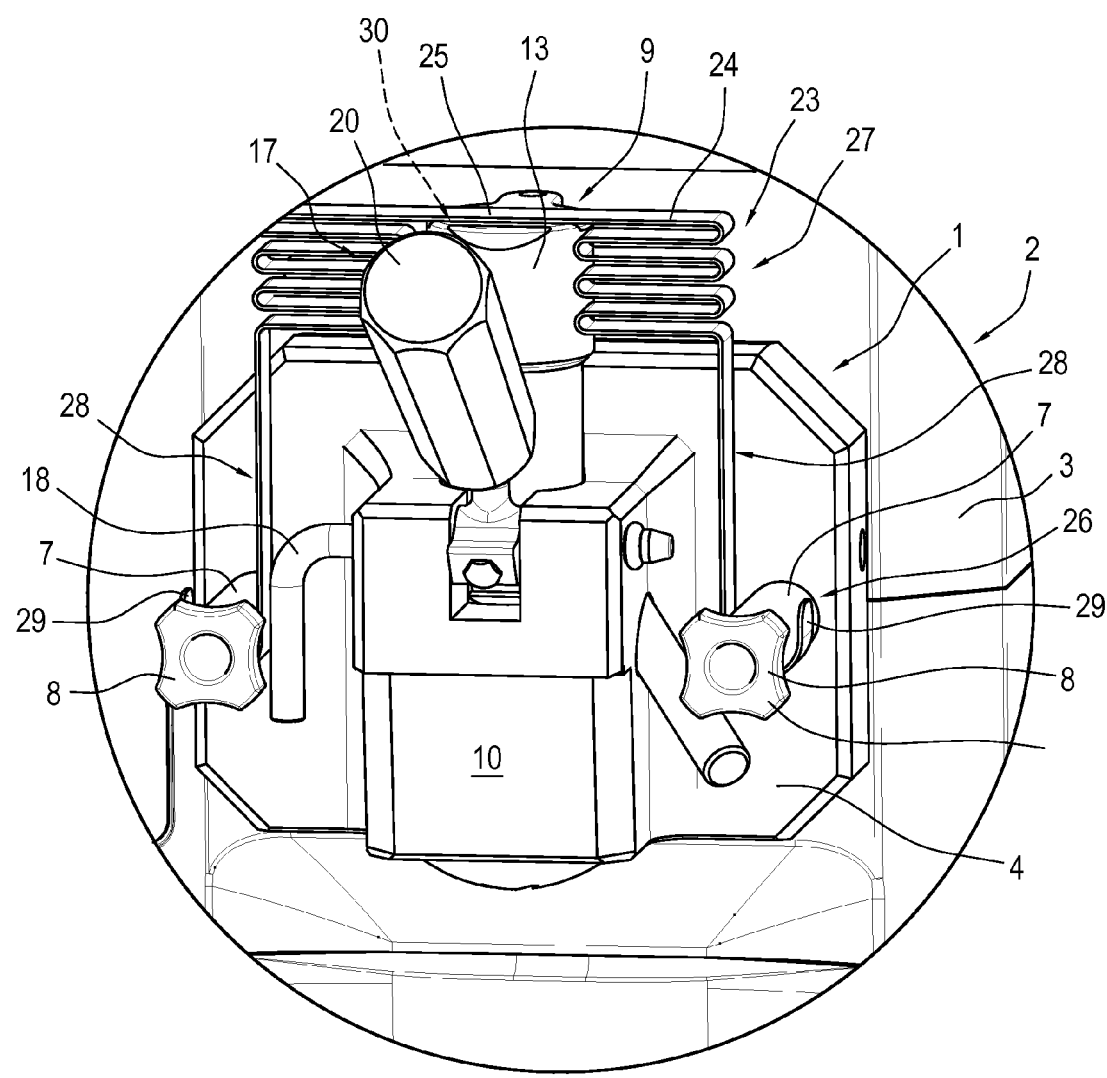
FIG. 2 is an enlarged view of the piston-operated dispenser unit of FIG. 1.

The machine 2, shown in its entirety in FIG. 1, is, in particular, of the type capable of making and dispensing liquid or semi-liquid food products such as ice cream, soft ice cream served directly from the machine, yogurt ice cream or creamy ice cream cake and pastry fillings.

The machine 2 comprises a casing 3 or frame which houses a unit for processing the product to be dispensed. The processing unit is not described in detail here since it is of known type and is not the object of this invention.

The dispenser unit 1 comprises a door 4 mounted on a front dispensing mouth 5 of the machine 2. The door 4 is shown in FIGS. 1, 2 and 4 to 6, whilst it has been removed from FIG. 3 for convenience and clarity of description.

The door 4 sealedly closes an external front flange 6 of the mouth 5 (FIG. 3) by means of a sealing ring not illustrated and is held fixed in place by means of a pair of fastening elements 7 screwed on the case 3.

More specifically, each fastening element 7 is in the form of a bolt which projects from the front of the machine 2.

At the front ends of them, that is, the ends directed towards the user, the fastening elements 7, which also form part of the dispenser unit 1, have respective handwheels 8 to make it easier for the user to remove and refit the door 4.

Figure 4:
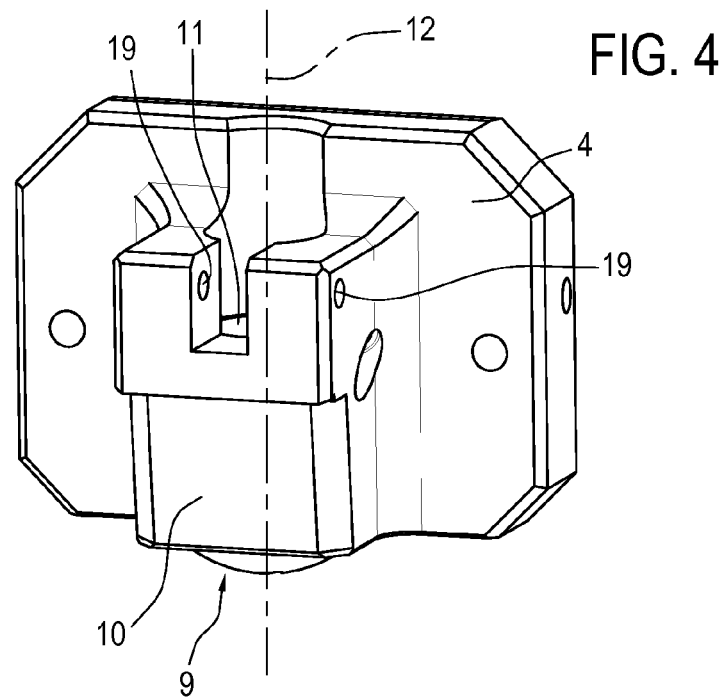
FIGS. 4, 5 and 6 are a front view, a rear view and a bottom view, respectively, showing the above mentioned removed component relative to the mounting position of that component on the machine of FIG. 1.

The dispenser unit 1 further comprises a dispensing tap 9, in turn comprising a main body 10, extending frontally from the door 4 and forming, inside the latter, an outflow duct 11 for the product to be dispensed (FIG. 4).

Preferably, the body 10 of the tap 9 is made as a single part built into the door 4 and is defined by a front portion protruding from the door 4. More specifically, the duct 11 is defined by a long cylindrical cavity formed inside the door 4. This cylindrical cavity extends longitudinally along its central axis 12 which, when the door 4 is fitted, runs vertically.

The tap 9 also comprises a cylindrical piston 13 which is slidably mounted inside the duct 11 and which is mobile between a raised, open position and a lowered, closed position of the bottom dispensing mouth of the duct 11.

Figure 5:
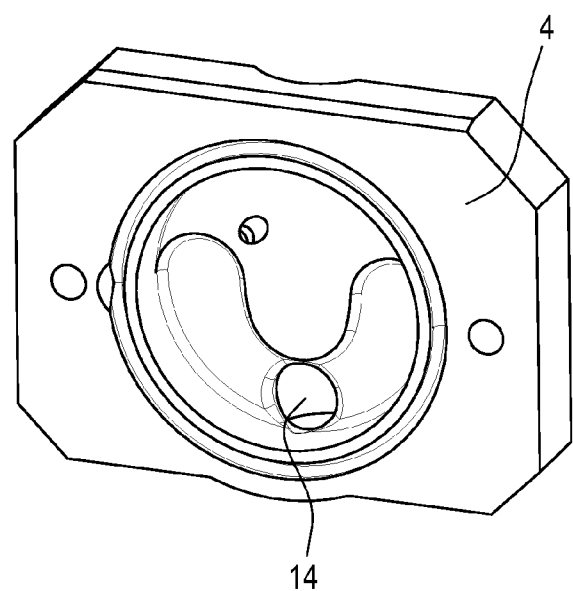

In its lowered position, the piston 13 occludes a lateral mouth 14 of the duct 11, thus placing the latter in communication with the aforementioned dispensing mouth 5 of the machine 2 (FIG. 5). When the piston 13 is raised to its open position, the bottom dispensing mouth of the duct 11 and the dispensing mouth 5 are placed in communication through the mouth 14.

Figure 3:
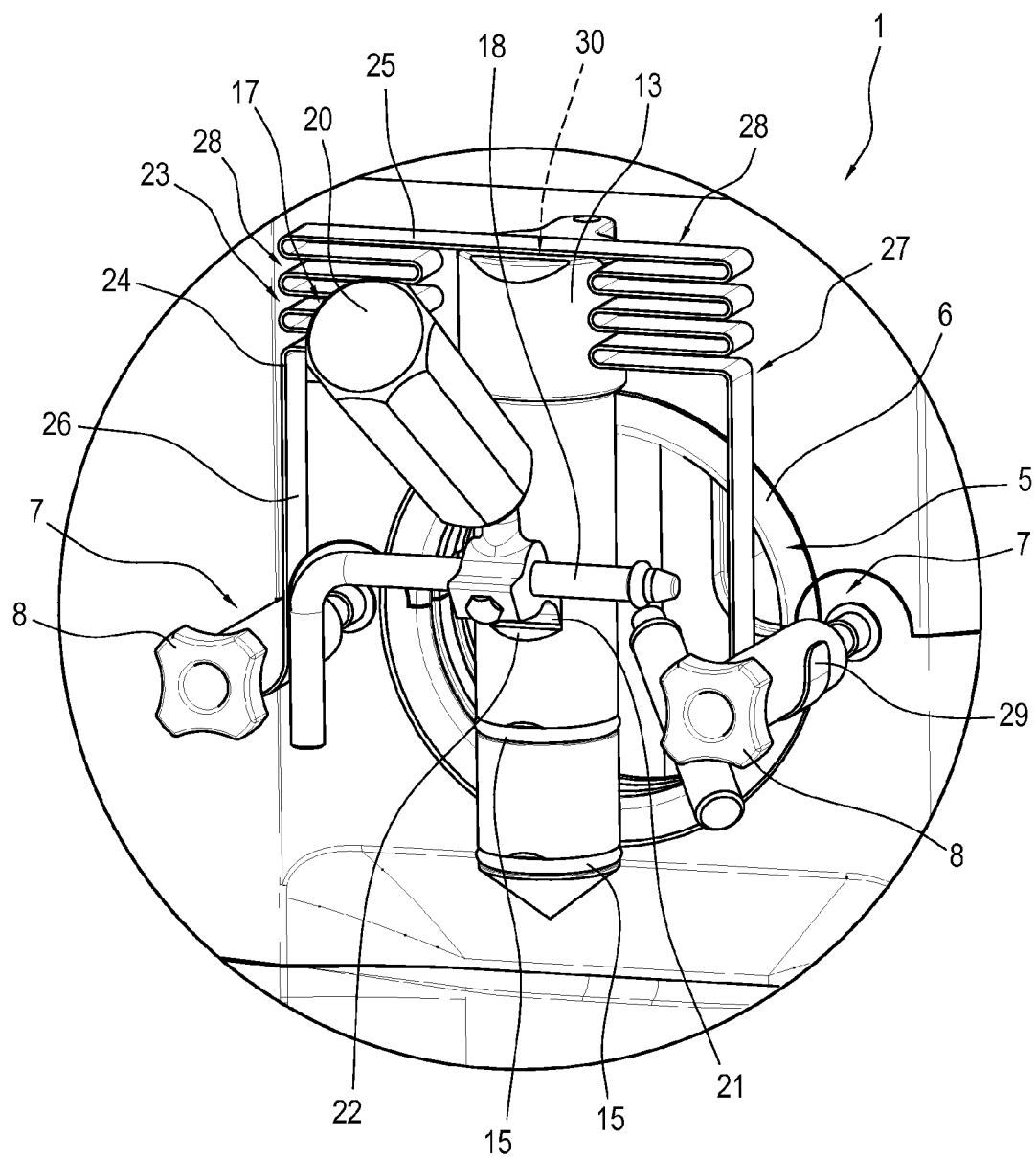
FIG. 3 is another enlarged view of the piston-operated dispenser unit of FIG. 1, with a component of the unit removed in order to illustrate others.

Two sealing rings 15, axially spaced from each other, are housed in respective peripheral annular grooves of the piston 13 to prevent unwanted leakage of product from the duct 11 when the machine 2 is in operation (FIG. 3).

Figure 6:
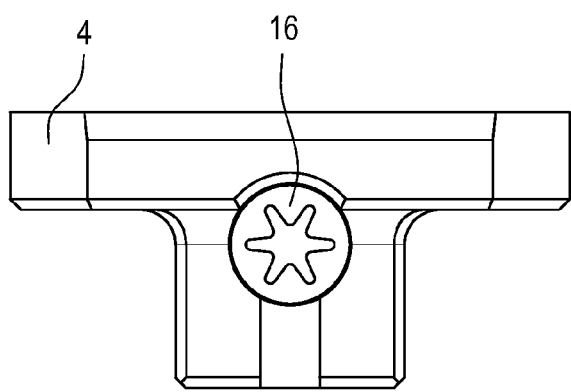

The bottom dispensing mouth of the duct 11 may be provided with a wall 16 with a specially shaped hole, for example star-shaped, to give the dispensed product a desired form (FIG. 6).

Under the bottom sealing ring 15, the piston 13 has a frustoconical end directed towards the wall 16.

To move the piston 13 between the aforementioned open and closed positions, and vice versa, the dispenser unit 1 also comprises a manually operated lever 17.

The lever 17 is lowered to move the piston 13 to the raised, open position and raised to move the piston 13 to the lowered, closed position.

The lever 17 is pivoted to a bolt 18 which is mounted to pass through two lateral holes 19 in the body 10 of the tap 9.

Relative to the bolt 18, the lever 17 mounts, on one side, a handgrip 20 for the user, and on the other side, an end 21 which engages a corresponding socket 22 formed on the periphery of the piston 13.

Advantageously, the dispenser unit 1 also comprises elastic means 23 operating on the piston 13 to apply an action for keeping the piston 13 in the closed position of the duct 11.

In other words, the dispenser unit 1 comprises elastic means 23 which apply to the piston 13 a force that opposes the action of the lever 17 when the latter is moved from the closed position to the open position of the duct 11. On the other hand, the same elastic means 23 apply a force in the same direction as the action of the lever 17 when the latter is moved from the open position to the closed position of the duct 11.

Preferably, the elastic means 23 comprise a spring 24 which acts directly on the piston 13.

The spring 24 has at least one mobile end 25, constrained to one end of the piston 13 which comes out of the duct 11 on the side opposite to the dispensing mouth of the duct 11, and at least one fixed end 26, constrained to a stationary portion of the dispenser unit 1. Preferably, the stationary portion is defined by one of the aforementioned fastening elements 7 by which the door 4 is fastened to the case 3 of the machine 2.

In one embodiment, the end 25 is fixed to the piston 13—for example, it may be welded to the piston 13—or it may be made as a single part with the piston 13. In both cases, therefore, the spring 24 may be integrally mounted on the piston 13.

In the embodiment illustrated, the piston 13 and the spring 24 are two distinct parts and, more specifically, the spring 24 is operatively coupled to the piston 13.

More generally speaking, it should be noted that the spring 24 is operatively coupled to the piston 13. More specifically, the spring 24 is located in a cavity 30 formed in the piston 13.

The spring 24 has at least one concertina-shaped portion 27 between the mobile end 25 and the fixed end and, in this configuration, it has a lengthening under tension which increases with the movement of the piston 13 and of the lever 17 towards the respective positions of opening of the duct 11.

In order to balance its action on the piston 13, the spring 24 has two branches 28 arranged symmetrically relative to the sides of the piston 13.

Each of the two branches 28 has a respective mobile end 25 and a respective fixed end 26.

Advantageously, the spring 24 is mounted on the outside of the door 4 and the two fixed ends 26 are hooked to the respective stationary portions of the dispenser unit 1 by means of its own hook-shaped ends 29, that is, U-shaped ends.

The hooked shape of the portions 29 and the above described outside mounting of the spring 24 allow existing machines to be conveniently and easily upgraded (by retrofitting). In effect, to do this, all that needs to be done is to substitute a standard piston 13 for a piston 13 equipped with the spring 24 which, as described above, can easily be hooked onto existing fastening elements 7.

Preferably, the spring 24 is housed under a protective cover (not illustrated) which may be easily removed and refitted by pressure fitting or by means of screws.

By this conception and design, the invention ensures that the dispensing duct 11 of the tap 9 will be totally and securely closed, thereby overcoming the drawback described above with reference to the prior art.

By this conception and design, the invention also constitutes a convenient and advantageous solution allowing existing machines to be rapidly upgraded (by retrofitting).

The invention described above is susceptible of industrial application and may be modified and adapted in several ways without thereby departing from the scope of the inventive concept claimed herein. For example, the dispenser unit might be equipped with two taps, juxtaposed with each other and each having its own lever and being substantially duplicate of what has been described above. Moreover, all the details of the invention may be substituted for technically equivalent elements.

What is claimed is:

1. A piston-operated dispenser unit for liquid or semi-liquid food products, comprising:
   a door mountable on a dispensing mouth of a machine for making and instantaneously dispensing confectionery products;
   at least one dispensing tap, in turn comprising a main body, extending frontally from the door and forming, inside the door, an outflow duct for the product to be dispensed, and a piston, slidably mounted inside the duct and mobile between an open position and a closed position of the duct;
   a manually operated lever, connected to the piston for moving the piston between the open position and the closed position of the duct, and vice versa; and
   elastic means operatively acting on the piston and designed to apply an action for returning the piston to said closed position;
   wherein said elastic means comprises a spring acting directly on the piston;

wherein said spring comprises at least one mobile end, constrained to one end of the piston which comes out of the duct on the side opposite to the dispensing mouth of the duct, and at least one fixed end, constrained to a stationary portion of the dispenser unit;

wherein said spring comprises two branches arranged symmetrically relative to the sides of the piston; and wherein each of said branches comprises a respective mobile end, constrained to one end of the piston which comes out of the duct on the side opposite to the dispensing mouth of the duct, and a respective fixed end, constrained to a stationary portion of the dispenser unit.

2. The dispenser unit according to claim 1, wherein said fixed end is hooked to a stationary portion of the dispenser unit by means of its own hook-shaped end portion.

3. The dispenser unit according to claim 1, wherein said spring comprises at least one concertina-shaped portion between said mobile end and said fixed end.

4. The dispenser unit according to claim 1, wherein said spring has a lengthening under tension which increases with the movement of the piston and of the lever towards the respective positions of opening of the duct.

5. The dispenser unit according to claim 1, wherein said spring is mounted on the outside of the door.

6. The dispenser unit according to claim 5, wherein said spring is housed in a protective cover.

7. A machine for making and instantaneously dispensing confectionery products, wherein it comprises a dispenser unit according to claim 1.

\* \* \* \* \*

UNITED STATES PATENT AND TRADEMARK OFFICE
CERTIFICATE OF CORRECTION

PATENT NO. : 9,560,865 B2  
APPLICATION NO. : 14/553036  
DATED : February 7, 2017  
INVENTOR(S) : Cocchi et al.

Page 1 of 1

It is certified that error appears in the above-identified patent and that said Letters Patent is hereby corrected as shown below:

On the Title Page

Item (74), after "Attorney, Agent, or Firm" should read --, Renner, Otto, Boisselle & Sklar, LLP--.

Signed and Sealed this  
Fourth Day of April, 2017

Michelle K. Lee  
*Director of the United States Patent and Trademark Office*